United States Patent
Sinz et al.

(10) Patent No.: US 6,415,660 B1
(45) Date of Patent: Jul. 9, 2002

(54) METHOD AND APPARATUS FOR THE HIGHLY ACCURATE DETERMINATION OF THE FILLING LEVEL OF A PRODUCT IN A CONTAINER

(75) Inventors: Michael Sinz, Binzen; Roland Müller; Dietmar Spanke, both of Steinen; Robert Lalla, Lörrach, all of (DE)

(73) Assignee: Endress + Hauser GmbH + Co., Maulburg (DE)

( * ) Notice: Subject to any disclaimer, the term of this patent is extended or adjusted under 35 U.S.C. 154(b) by 0 days.

(21) Appl. No.: 09/551,505

(22) Filed: Apr. 17, 2000

(30) Foreign Application Priority Data

Jul. 15, 1999 (EP) .......................................... 99 11 3685

(51) Int. Cl.⁷ .............................................. G01F 23/00
(52) U.S. Cl. ................................................. 73/290 R
(58) Field of Search ............................. 73/290 V, 291; 340/658, 621; 324/95

(56) References Cited

U.S. PATENT DOCUMENTS

| | | | | |
|---|---|---|---|---|
| 3,184,968 A | * | 5/1965 | Werner ...................... | 73/290 V |
| 3,184,969 A | * | 5/1965 | Bolton ...................... | 73/290 V |
| 4,090,407 A | * | 5/1978 | Shuler et al. .............. | 73/290 V |
| 4,183,007 A | * | 1/1980 | Baird ........................ | 73/290 V |
| 4,670,754 A | * | 6/1987 | Zacchio .................... | 342/124 |
| 4,675,854 A | * | 6/1987 | Lau .......................... | 367/908 |
| 5,036,477 A | * | 7/1991 | Forster et al. ............. | 364/567 |
| 5,614,911 A | | 3/1997 | Otto et al. | |
| 5,827,943 A | * | 10/1998 | Schmidt .................... | 73/1.73 |
| 5,847,567 A | * | 12/1998 | Kielb et al. ................ | 324/642 |

FOREIGN PATENT DOCUMENTS

| DE | 31 07 444 A1 | 2/1981 |
|---|---|---|
| DE | 43 27 333 A1 | 8/1993 |
| DE | 44 07 369 A1 | 3/1994 |

OTHER PUBLICATIONS

Measuring Process and Storage Tank Level with Radar Technology, Dr. Detlef Brumbi, Aug. 5, 1995, pp 256–260.
Radar Applications in Level Measurement, Distance Measurement and Nondestructive Material Testing, Johanngeorg Otto, Aug. 9, 1997, pp. 1113–1121.

* cited by examiner

*Primary Examiner*—Hezron Williams
*Assistant Examiner*—Katina Wilson
(74) *Attorney, Agent, or Firm*—Rose McKinney & Evans LLP

(57) ABSTRACT

The invention relates to a method for the highly accurate determination of the filling level (q) of a product (4) in a container (2), measuring signals being transmitted in the direction of the surface (5) of the filled product (4) and reflected at the surface (5) as echo signals and the filling level (q) in the container (2) being determined by evaluation of the amplitude values (A) and phase values ($\psi$) of the reflected echo signals by means of a pulse delay-time method. Furthermore, an apparatus suitable for carrying out the method is proposed.

The invention is based on the object of proposing a method and an apparatus which permit highly accurate filling level measurements in containers (2), even if multipath propagation or multimode propagation occurs.

The object is achieved by compensating for errors which occur in the determination of the filling level (q) and are caused by interference signals which interfere constructively or destructively with the echo signals reflected regularly at the surface (5) of the filled product (4).

28 Claims, 6 Drawing Sheets

METHOD AND APPARATUS FOR THE HIGHLY ACCURATE DETERMINATION OF THE FILLING LEVEL OF A PRODUCT IN A CONTAINER

The invention relates to a method for the highly accurate determination of the filling level of a product in a container, measuring signals being transmitted in the direction of the surface of the filled product and reflected at the surface as echo signals and the filling level in the container being determined by evaluation of the amplitude and phase values of the reflected echo signals by means of a pulse delay-time method. Both the pulse-radar method and the FMCW method, in which continuous waves are frequency-modulated in a periodically linear manner, for example with a sawtooth voltage, may be used. Furthermore, the invention relates to an apparatus for the highly accurate determination of the filling level of a product in a container.

Pulse delay-time methods use the physical law according to which the transit distance is equal to the product of the delay time and the propagation velocity. In the case of filling level measurement, the transit distance corresponds to twice the distance between the antenna and the surface of the filled product. The actual useful echo signal and its delay time are determined on the basis of the so-called echo function or the digital envelope curve, the envelope curve reproducing the amplitudes of the echo signals as a function of the 'antenna-surface of the filled product' distance. The filling level itself is then obtained from the difference between the known distance of the antenna from the bottom of the container and the distance of the surface of the filled product from the antenna, determined by the measurement.

DE 31 07 444 A1 provides a description of a high-resolution pulsed radar method. A generator generates first microwave pulses and transmits them via an antenna at a predetermined transmission repetition rate in the direction of the surface of the filled product. A further generator generates reference microwave pulses, which are identical to the first microwave pulses but differ slightly from them in the repetition rate. The echo signal and the reference signal are mixed. At the output of the mixer there is an intermediate-frequency signal. The intermediate-frequency signal has the same waveform as the echo signal, but is stretched in comparison with the latter by a time dilation factor which is equal to a quotient of the transmission repetition rate and the difference in frequency between the first microwave pulses and the reference microwave pulses. At a transmission repetition rate of several megahertz, a difference in frequency of a few hertz and a microwave frequency of several gigahertz, the frequency of the intermediate-frequency signal is below 100 kHz. The advantage of the transformation to the intermediate frequency is that relatively slow, and consequently low-cost, electronic components can be used for signal acquisition and/or signal evaluation.

The signal evaluation takes place by means of the so-called envelope-curve evaluation. The envelope curve itself is the result of a rectification, optionally a logarithmization and a digitization of the intermediate frequency. The distance is determined by determining the distance from a reference signal of the useful echo signal, which represents the filling level. The number of sampling points between the two maxima with a constant sampling time is directly proportional to the 'antenna-surface of the filled product' distance.

To increase the measuring accuracy, it has already become known to use for the evaluation not only the maxima (peaks), which supply amplitude information, but also their phase relationships. For this purpose, the amplitude-modulated intermediate frequency is demodulated and broken down into its complex elements. This is achieved, for example, by so-called quadrature demodulation, i.e. the intermediate frequency is multiplied once by a sine oscillation (Q) and once by a cosine oscillation (I), both oscillations having a frequency similar to the intermediate frequency. The high frequencies produced by the multiplication are filtered out with a low-pass filter. The envelope-curve signal HK is obtained from the root of the sum of the squares of I (in-phase component) and Q (quadrature component): $HK = \sqrt{I^2 + Q^2}$. Subsequently, the customary amplitude evaluation is carried out; at the found locations of the maxima, the respective phase relationship and the difference of the two phase relationships are additionally determined. The distance of the antenna from the surface of the filled product is made up of a component comprising integral wavelengths, resulting from the amplitude evaluation, and a phase remainder.

The known methods produce reliable results as long as it is ensured that the signals received by the antenna are reflected exclusively at the surface of the filled product (incidence and reflection take place in the direction of the normal). As soon as so-called multipath propagation occurs, the measuring accuracy deteriorates. Multipath propagation means that the echo signals contain not only the actual useful signal but also an interference signal component, which is attributable to retroreflections of the measuring signals at the container wall or at other internal elements located in the space inside the container.

Previous proposals for solving this problem are confined to excluding the occurrence of interference signals from the outset. According to a first configuration, undesired retroreflections can be prevented by the antenna being positioned so far away from the container wall (or some other interfering retroreflector) that the impingement of measuring signals on these 'interference retroreflectors' can be reliably excluded.

The disadvantages of this possibility of avoidance are obvious; particularly with the considerable dimensions of the storage containers of the kind used in petrochemistry, for example, the retrofitting, repair or exchange of a filling-level measuring device in the central region of the container cover is much more difficult to accomplish than in the region of the edge. In addition to this there is a further source of error in the measurement of the filling level, the significance of which is all the greater the further the measuring device is away from the edge region of the container cover: the covers of large storage containers, such as storage tanks or silos, usually have an outwardly curved or tapered shape. If the side walls of the container bulge, which is always to be found in the region of the maximum filling level of the containers, the lowering of the cover, and consequently the changing of the 'antenna-container bottom' reference distance, has a greater effect in the central region than in the edge region.

Furthermore, it has previously been attempted to tackle the problem of multipath propagation by using an antenna with an optimized directional pattern. Such antennas, adjusted specifically for the individual case, are of course very expensive, which drives up the costs of the filling-level measuring device.

In certain applications it is necessary to replace the free-field measurement for determining the filling level by a measurement using a stilling well. Stilling wells are always used, for example, if the measurement results would be falsified by wave formation of the filled product within the container.

As already mentioned above, the filling level is determined by means of the delay time of the electromagnetic waves over twice the 'antenna-surface of the filled product' distance. In order that the measurement result is correct, the propagation velocity of the electromagnetic waves in the intermediate space between the antenna and the filled product must therefore be known exactly. In many applications, the propagation velocity is equated by approximation with the propagation velocity in air. However, this assumption is reliable only if the transverse dimensions of the space in which the electromagnetic waves propagate are large in comparison with the wavelength.

If the measurement of the filling level is performed by means of a stilling well, the assumption mentioned above is only approximately correct. A well or some other container of small diameter over which the waves propagate acts as a waveguide. Since the propagation of electromagnetic waves at the speed of light applies only in the ideal case where a wave packet can propagate undisturbed in free space, dispersion occurs in waveguides—the propagation velocity is thus dependent on the wavelength. The group velocity in a waveguide, decisive for the propagation of a wave packet, is less than the speed of light.

If the wavelength is of the order of magnitude of the propagation space, a number of modes capable of propagation exist, having different propagation velocities on account of dispersion (→multimode propagation). The consequence of multimode propagation is the occurrence of constructive and destructive interferences between the measuring signals, which in turn leads to an oscillating measuring error being superposed on the actual filling-level measuring signal within a critical measuring range and falsifying the signal. Owing to the oscillation, the paradoxical case can occur that, in spite of an actual decrease in filling level for example, an increasing filling level value is indicated by the measuring apparatus. Such an obvious measuring error is of course completely unacceptable.

Incidentally, the critical measuring range lies between the transit distance of zero and a maximum transit distance, at which the measuring error disappears, since the wave packets have become so far apart that interferences no longer occur. This maximum transit distance is dependent on the nature of the waveguide and the frequency used for the electromagnetic waves.

This problem can again be alleviated by using waveguides of very high quality. In addition, the antenna must be adjusted optimally to the respective diameter of the waveguide. However, a low-cost solution is distinguished by the very fact that the wells do not have to be of a particularly high quality and that, furthermore, it is possible to use a low-cost antenna which is capable of covering any inside diameters of stilling wells acting as waveguides.

The invention is based on the object of proposing a method and an apparatus which permit highly accurate filling level measurements in containers-irrespective of the occurrence of multipath propagation or multimode propagation.

The object is achieved with respect to the method by compensation for errors which occur in the determination of the filling level and are caused by interference signals which interfere constructively or destructively with the echo signals reflected regularly at the surface of the filled product. Causes of errors which occur because of multipath propagation are constructive or destructive interferences between the actual useful echo signal that is reflected at the surface of the filled product and the component of the useful echo signal that is reflected by a retroreflector, for example the container wall. If x' is the distance covered by the actual useful echo signal that has been reflected at the surface of the filled product, and x" is the distance, longer by $\Delta x$, of the useful echo signal that has been reflected at some other retroreflector, in particular the container wall, interferences occur if the difference between the distances satisfies the condition $\Delta x = n \cdot \lambda/2$, n being any integral number. The maxima of the two signals are so close together that the resolution of the electronics is not adequate to separate the two peaks from one another. The method according to the invention now allows these errors to be reliably eliminated, which expressed in figures means that the error tolerances in the range of the filling level measurement are reduced by an order of magnitude in comparison with the previously known methods. The same problem also occurs, as described above, as a consequence of the multimode propagation of wave packets in stilling wells or other containers carrying the wave packets. The method according to the invention is therefore also ideal for eliminating measuring errors caused by multimode propagation.

The advantages of the solution according to the invention can be seen on the one hand in that the antenna can also be positioned in the edge region of the container or in the region of some other retroreflector located in the space inside the container without interference signals falsifying the measurement results. It is consequently now possible without any problem to go below the previously required minimum distance from an interfering reflector. Since it is possible for the component comprising the interference signals to be specifically eliminated from the useful echo signal, it is additionally possible to use an antenna which, although capable of being adapted optimally to the reflection properties of the respective filled product, does not need to have an optimized directional pattern dependent on the respectively desired installation position.

In the case of multimode propagation, the advantage likewise lies in the considerable cost savings, since on the one hand high-quality waveguides do not have to be used; on the other hand, one antenna can be used for a large number of waveguides or stilling wells with different dimensions.

According to an advantageous development of the method according to the invention, it is provided that a correction value is determined and stored for selected filling level values, at least within a critical filling-level measuring range in which the interference signals are produced.

A preferred embodiment of the method provides in particular that the starting filling level is measured; the correction value is subsequently initialized at zero; starting from this starting filling level, at least the critical filling-level measuring range is run through, for example successively and step-by-step; then a correction value is calculated and stored for every selected filling level value within the filling-level measuring range.

To allow the number of values actually measured within the critical filling-level measuring range to be reduced to a minimum amount, an advantageous embodiment of the method according to the invention proposes that, for providing a continuous set of correction values, the correction values between two, for example successive, filling level values are respectively interpolated.

A particularly advantageous embodiment of the method according to the invention provides that, for successive filling level values $q_K$, $q_{K+1}$, the correction values are determined as follows: let $q_K = q_0$ be the starting filling level. For the starting filling level, the correction value is initialized at a predetermined value, for example zero; subsequently, for the changed filling level $q_{K+1}$, the difference of the corrected amplitude distance values A' ($q_k$) and the phase distance value is calculated. Consequently, a new correction value is determined and stored for each filling level successively addressed. The calculation of the new correction value is preferably performed in accordance with the following formula:

$$K(qK+1)=\psi(qK+1)-A(qK+1)=\psi(qK+1)-A(qK+1)-K(qK+1)$$

The embodiment according to the invention uses the fact that phase evaluation is much more sensitive in broad ranges, and consequently produces more accurate measurement results, than amplitude evaluation. If relatively great measuring errors occur in amplitude evaluation just because of multipath propagation or multimode propagation, the measuring errors which phase evaluation produces are still relatively small. Only if the measuring error in amplitude evaluation is greater than $\lambda/4$ (which, for example at a frequency of 6.3 GHz, corresponds to a measuring error of 12 mm), does a phase shift occur in the phase evaluation, causing a measuring error of 24 mm. The error from the phase evaluation in the range of a phase shift is consequently twice the magnitude of the error from the amplitude evaluation. Since the method according to the invention avoids such phase shifts, the high measuring accuracy aimed for, of about 1 mm, in the determination of the filling level is achieved.

If a correction value is assigned to every filling level within the measuring range in which multipath propagation or multimode propagation is to be feared, it is subsequently possible to correct measured filling level values correspondingly. The previously critical case where the filling-level measuring device is switched off for some reason then does not present any problems. If all the correction values in the critical filling-level measuring range are known, that correction value which has previously been determined and stored for the corresponding filling level is used after switching on the measuring device for correcting the currently measured filling level.

Nevertheless, it may happen that the measuring device is switched off at a point in time at which the correction values are not yet available over the entire critical filling-level measuring range. Here, a distinction must be drawn between two cases: if it is ensured that the filling level has not changed during the switched-off period, an advantageous embodiment of the method according to the invention provides that the correction value last stored before switching off is used for initialization.

In the case where not all the correction values in the critical filling-level measuring range are known and, in addition, it is not possible to rule out the possibility that the filling level has changed during the switched-off period, the correction value is initialized at zero after the filling-level measuring device is switched off; for each correction value there is additionally stored a status value, which provides information on the reliability of the respective correction value. These status values may, for example, say: 'certain', 'uncertain', 'undetermined'. In the course of further measurements, the correction values determined are adapted to the correction values already stored, the newly determined correction values being corrected if need be.

One variant of the method according to the invention provides that a unique phase correction value (P(q)) is determined on the basis of the determined correction value, where $P=n\cdot\lambda/2$ with $n \in Z$, and the phase distance value is corrected in a way corresponding to the unique correction value. It is further proposed that gray zones are defined, at which no unique phase correction value is defined after switching off and the correction value (K(q)) is small.

The invention is explained in more detail with reference to the following drawings, in which.

Figure 1:
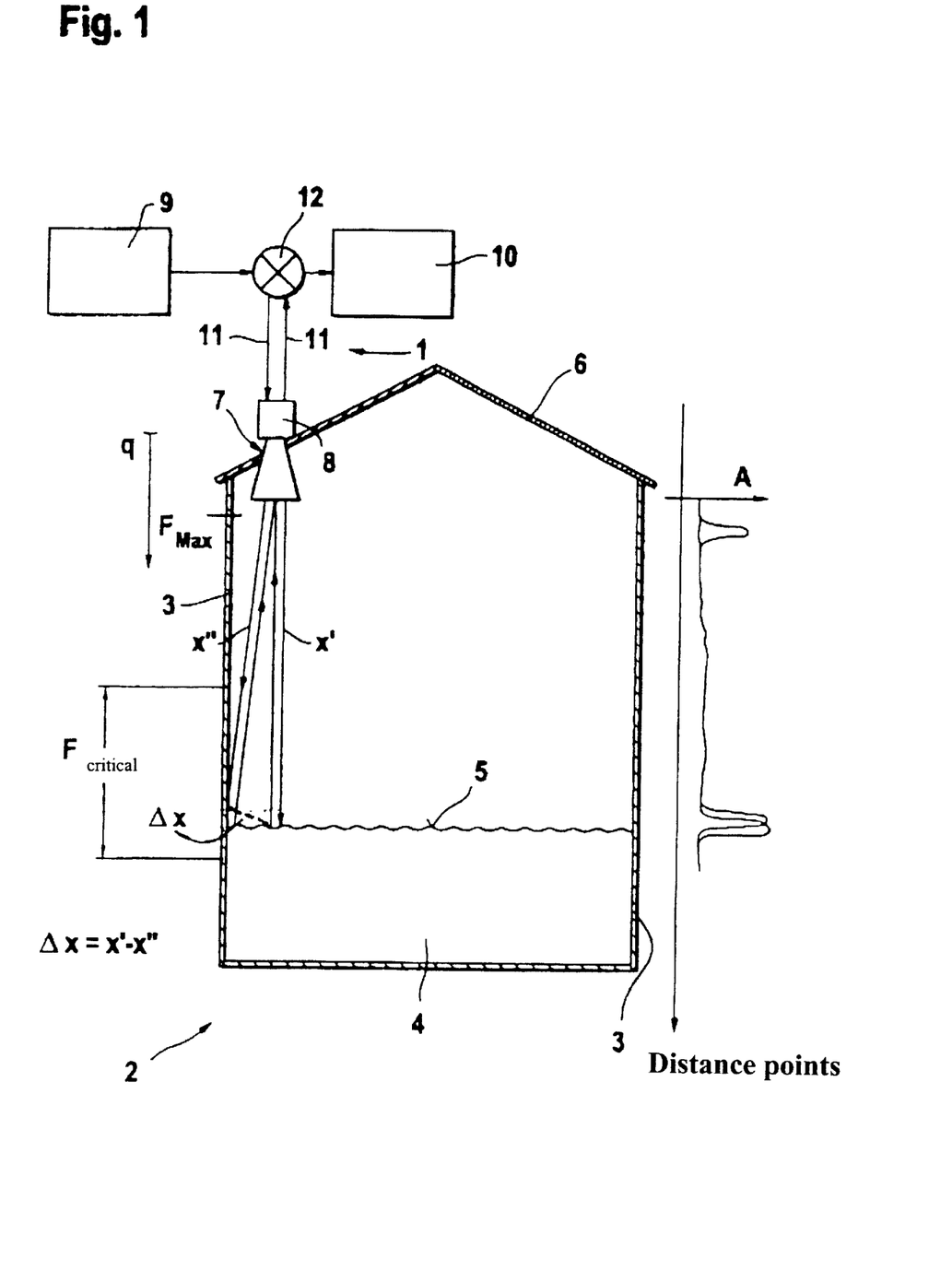
FIG. 1 shows a schematic representation of a first embodiment of the apparatus according to the invention.

FIG. 1 shows a schematic representation of a first embodiment of the apparatus according to the invention. A filled product 4 is stored in a container 2. Serving to determine the filling level F is the filling-level measuring device 1, which is mounted in an opening 7 in the edge region of the cover 6. Transmission signals, in particular microwaves, generated in the transmission circuit 9 are emitted via the antenna 8 in the direction of the surface 5 of the filled product 4. The transmission signals are partially reflected at the surface 5. The reflected echo signals are received and evaluated in the reception/evaluation circuit 10. The correct timing of the emission of the transmission signals and reception of the echo signals is carried out by means of the transmission/reception filter 12.

If the momentary filling level q is within a critical filling-level measuring range $F_{critical}$, multipath propagation occurs, i.e. the echo signals received contain not only the signals reflected regularly at the surface 5 of the filled product 4 but also interference signals that have been reflected not at the surface 5 of the filled product 4 but at the container wall 3 or some other internal elements located in the container 2. The internal elements may be, for example, a stirring mechanism. If the difference in distance $\Delta x=x'-x''$ between the regularly reflected echo signals and the interference signals is equal to an integral multiple of $\pm\lambda/2$, constructive and destructive interferences occur. As a consequence of the interferences, filling-level echo signals which are so close together that they can no longer be resolved by the evaluation circuit customarily used appear in the envelope curve. In FIG. 1, the echo signals are likewise schematically represented as a function of the transit distance (at sampling points). By means of the method according to the invention or the apparatus according to the invention, measuring errors caused by amplitude fluctuations are eliminated.

Figure 2:
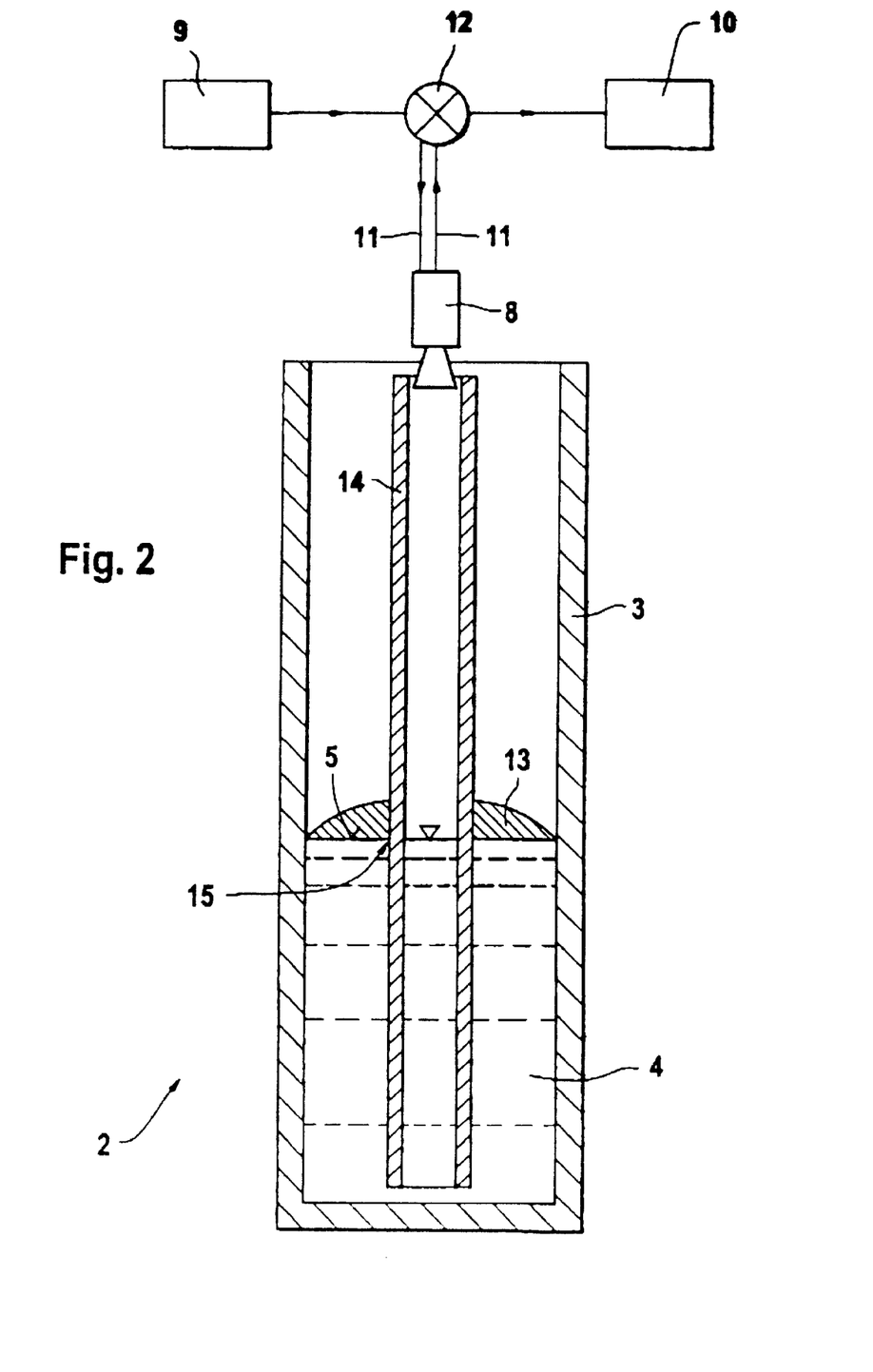
FIG. 2 shows a schematic representation of a second embodiment of the apparatus according to the invention.

While FIG. 1 reproduces free-field measurement, FIG. 2 shows a schematic representation of a second embodiment of the apparatus according to the invention, in which the measurement is performed by means of a stilling well 14. The stilling well behaves—from a physical viewpoint—like a waveguide. The stilling well 14 is led through an opening 15 in a floating roof 13 and reaches into the vicinity of the bottom of the container 2. A floating roof 13 is preferably used, incidentally, if the formation of an explosive gas space above the filled product 4 is to be avoided. While in the case of free-field propagation of the electromagnetic waves multipath propagation is responsible for the interference signals in the reflected filling-level echo signal, in the case of stilling well measurement multimode propagation causes the interference signals. The influence of both interference signals on the quality of the filling-level measured value can be eliminated with the aid of the solution according to the invention.

Figure 3:
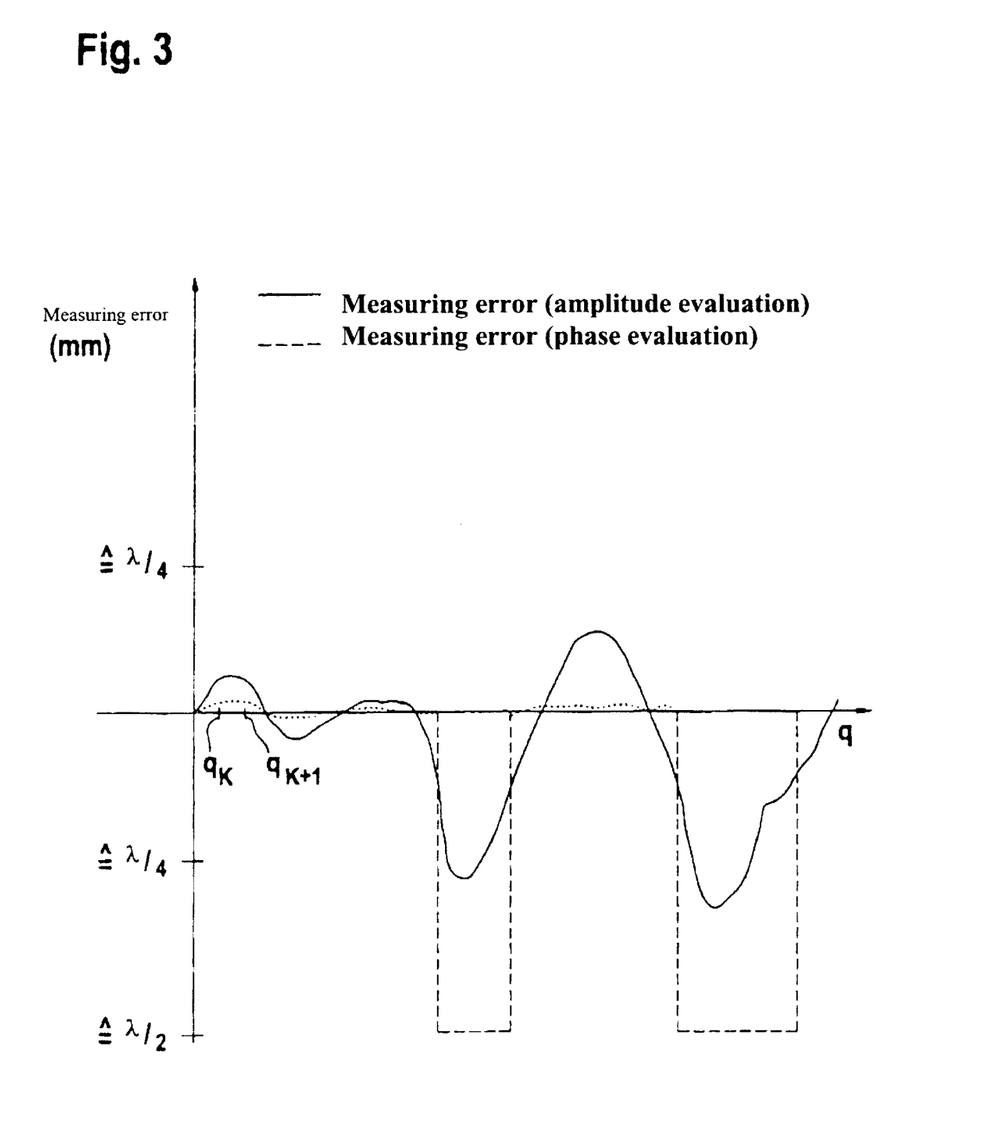
FIG. 3 shows a diagram which shows the measuring errors from the amplitude evaluation and the phase evaluation for different filling levels.

FIG. 3 shows a diagram which represents the measuring errors produced from the amplitude evaluation and the phase evaluation, as a function of the respective filling level. The solid line identifies the measuring errors which have been determined on the basis of amplitude evaluation; the dashed line reproduces the measuring errors from the corresponding phase evaluation. It can be clearly seen that the phase errors are much more insensitive to multipath or multimode propagation than the corresponding amplitude measuring errors. Serious measuring errors only occur in the phase evaluation if the measuring error arising from the amplitude evaluation exceeds a certain limit value. This limit value corresponds to a value of $\pm\lambda/4$. With a wavelength of the measuring signals of 6.3 GHz, this limit value corresponds to a measuring error of 12 mm in the determination of the filling level. Up to this limit value, a very high accuracy is achieved by the evaluation of the phases of the echo signals. The advantageous development of the method according to the invention described below with reference to a flow diagram serves to avoid the jump in the measuring error in the phase evaluation.

Figure 4:
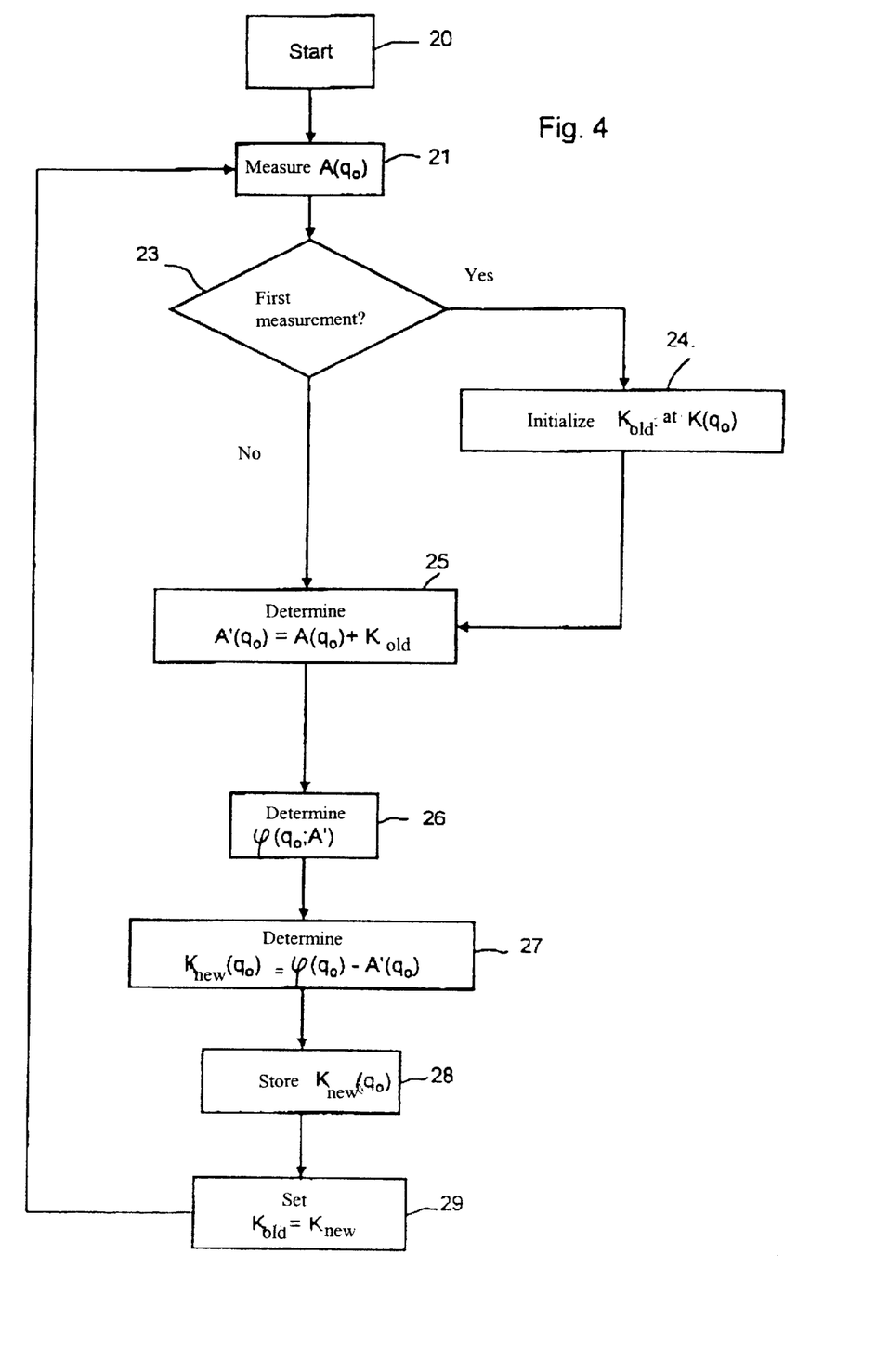
FIG. 4 shows a flow diagram for determination of the correction values according to a first embodiment.

Indicated in FIG. 4 is a flow diagram for determination of the correction values K(q) according to a first embodiment. These correction values K(q) allow a filling level value measured in a container 2 to be corrected in such a way as to eliminate interference signals that are superposed on the actual filling-level echo signal on account of multipath propagation or multimode propagation. In principle, relatively great measuring errors are to be expected if the resolution of the filling-level measuring device is not adequate to determine exactly the position of two maxima of the amplitude evaluation lying close together. As already described above, this is the case as soon as multipath propagation occurs in the free field or multimode propagation occurs in the stilling well: interference signals interfere constructively and destructively with the actual filling-level echo signal. Instead of a peak which represents the filling level, two peaks appear, which is reflected in a broadening or fluctuation of the amplitude maximum if the filling-level measuring device does not have adequate resolution.

The program proceeds as follows: after the program starts at point 20, the current distance $A(q_0)$ from the filling level $q_0$ is measured under program point 21. If this is the very first recording of a measured value, which is checked under program point 23, the correction value $K_{old}=K(q)$ is initialized at the appropriate value of the stored table $K(q_0)$ (program point 24). Incidentally, before putting into operation for the first time, this table has been initialized at zero or some other value. Therefore, every status is undetermined. Under program point 25, the corrected distance value is determined from the amplitude evaluation $A'(q_0)$. At point 26, this enters the phase evaluation. Under program point 27, a new correction value $K_{new}(q_0)$ is determined for the filling level $q_0$ in accordance with the following formula:

$$K_{new}(q_o)=\psi(q_o)-A'(q_o)=\psi(q_o)-A(q-_o)-K_{old}$$

The new correction value $K_{new}(q_0)$ is subsequently stored (program point 28). At point 29, $K(q_0)=K_{new}(q_0)$ is set. The correction value determined and stored provides information on how a measured filling-level echo signal has to be corrected under the given conditions in the container 2 or in the stilling well 13 in order to provide high-quality information on the current filling level q of the filled product 4 in the container 2.

Figure 5:
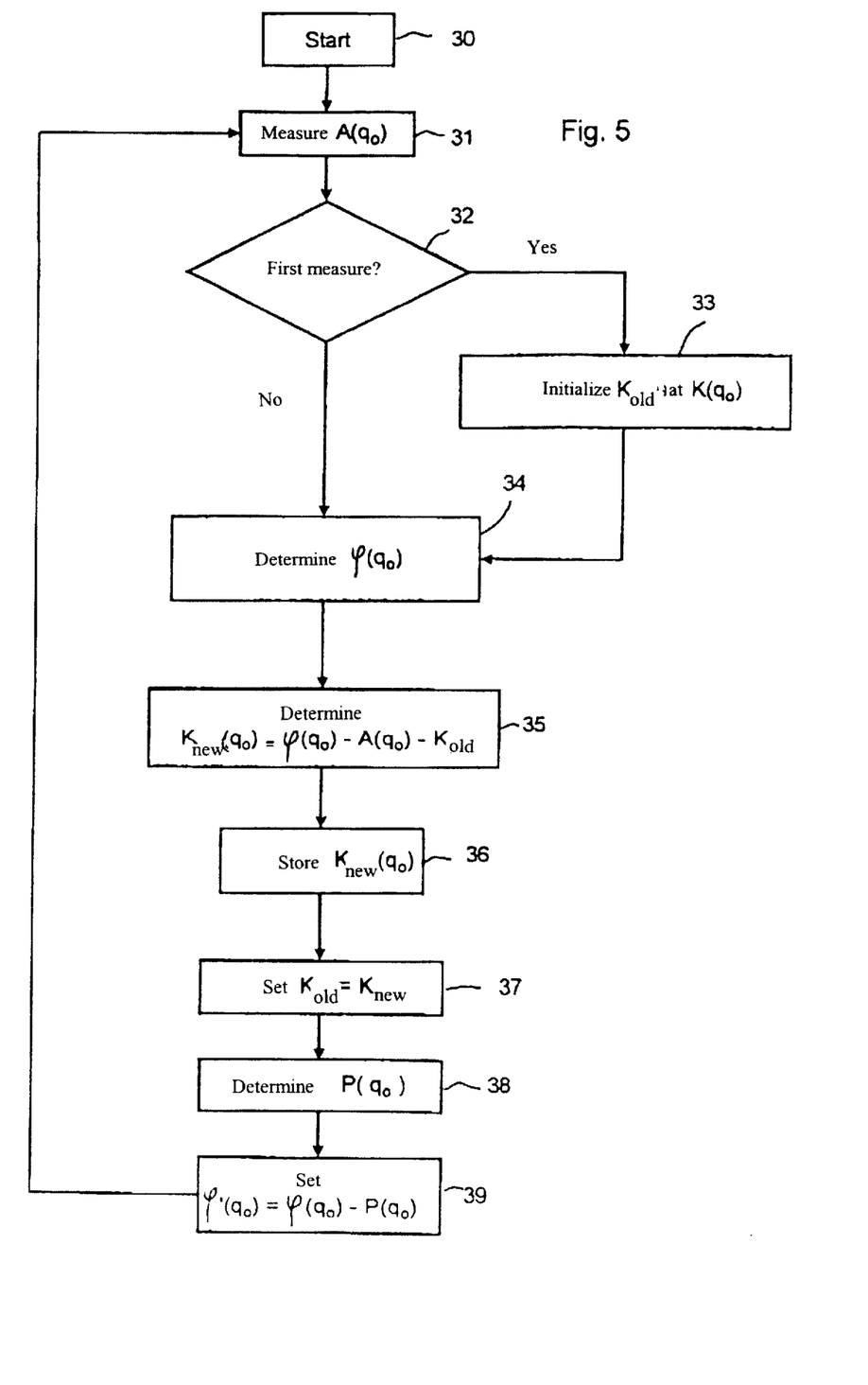
FIG. 5 shows a flow diagram for determination of the correction values according to a second embodiment.

Reproduced in FIG. 5 is a flow diagram for determination of the correction values K(q) according to, a second embodiment. In this case as well, the correction values K(q) allow a filling level value measured in a container 2 to be corrected in such a way as to eliminate interference signals that are superposed on the actual filling-level echo signal on account of multipath propagation or multimode propagation. While in the first case the correction values K(q) are specified in the unit of sampling points or in some other unit of distance, in the present second case either correction values K(q) or the number of corrected wavelengths $\lambda$ or the phase correction values P(q) are determined and stored.

After the program starts at point 30, the current distance $A(q_0)$ from the filling level $q_0$ is measured at point 31. If this is the very first recording of a measured value, which is checked under program point 32, the correction value K(q) is initialized at the appropriate value of the stored table $K(q_0)$ (program point 33). Incidentally, before putting into operation for the first time, this table has been initialized at zero or some other predetermined value. Therefore, every status is undetermined. Under program point 34, the distance value is determined from the phase evaluation $\psi(q_0)$ for the filling level $q_0$. At point 35, a new correction value $K_{new}(q_0)$ is determined for the filling level $q_0$ in accordance with the following formula:

$$K_{new}(q_o)=\psi(q_o)-A(q_o)-K_{old}.$$

The new correction value $K_{new}(q_0)$ is subsequently stored (program point 36). At point 37, $K_{old}(q_0)=K_{new}(q_0)$ is set. The correction value $K_{new}(q_0)$ determined and stored provides information on how a measured filling-level echo signal has to be corrected under the given conditions in the container 2 or in the stilling well 13 in order to provide highly accurate information on the current filling level $q_0$ of the filled product 4 in the container 2. Furthermore, a phase correction value $P(q_0)$ is determined under program point 38. With this value, the corrected distance value $\psi'(q_0)$ is calculated under point 39 in accordance with the following relationship:

$$\psi'(q_o)=\psi(q_o)-P(q_o).$$

Figure 6:
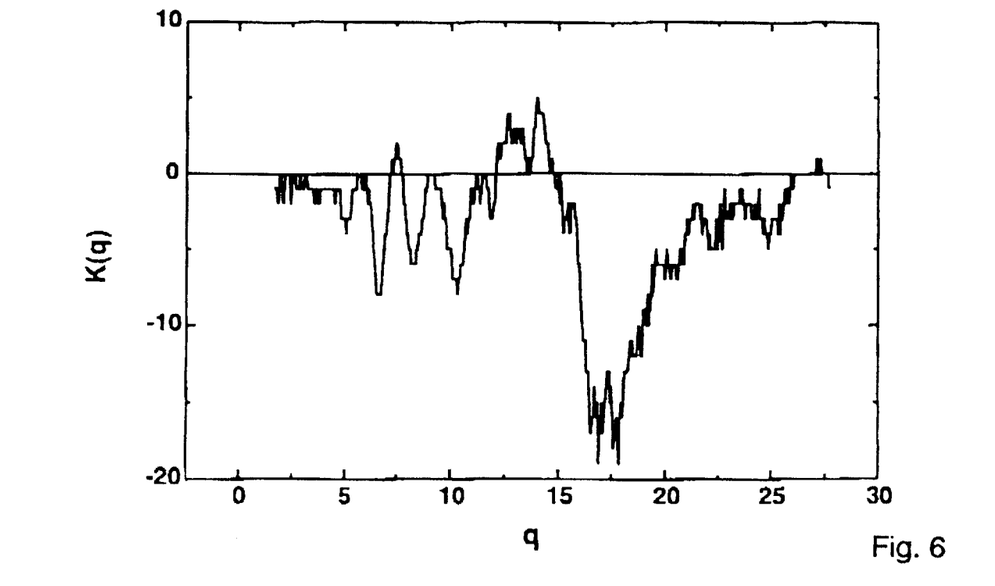
FIG. 6 shows a schematic representation of the stored correction values K(q) as a function of the filling level (q) and FIG. 7 shows a schematic representation of the correction values after switching off the filling-level measuring device.

In FIG. 6 there can be seen a schematic representation of the stored correction values K(q) as a function of the filling level q. The filling level q is the value obtained from the evaluation of the envelope curve without correction. The points identify the filling levels q at which a correction value has been determined, preferably in a way corresponding to the flow diagram represented in FIG. 3. The measuring points lie so close together that the correction values K(q) between the measured filling levels can be interpolated. Each filling level q successively indicated by the measuring device is corrected by the correction value K(q), thereby eliminating measuring errors which have been caused by multipath propagation or multimode propagation during the measuring operation. It is consequently possible by means of the method according to the invention or the apparatus according to the invention to use one measuring device universally for highly accurate measurement in containers or waveguides of completely different dimensions and geometries.

The critical case already described above is sketched in FIG. 7: the measuring device is switched off at a point in time when not all the correction values K(q) within the critical filling-level measuring range are available. In addition, it is not possible to rule out the possibility that the filling level has changed during the switched-off phase.

Figure 7:
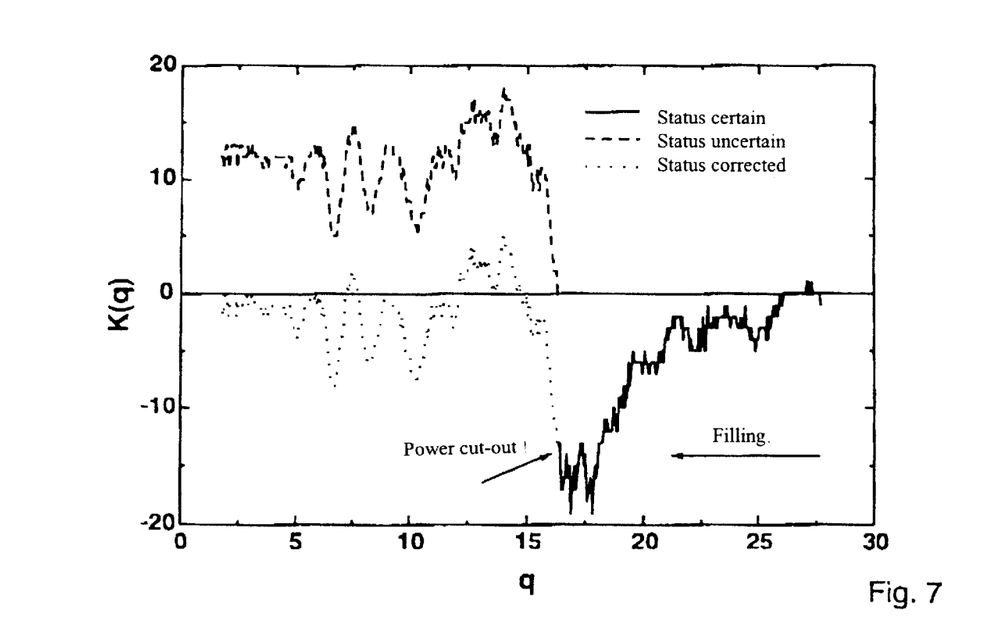

The correction values in the right-hand region of the curve (solid curve) have the status 'certain'. They were, for example, determined and stored in accordance with the abovementioned method. At a filling level of about 16 m, the power cuts out. After switching on the measuring device, it cannot be guaranteed that the measurements thereafter are correct. The reason for this is that the correction value $K(q_0)$ obtained from the table has not yet been determined in a previous measuring cycle. The status is undetermined, in other words not known, and the value of K is a random predetermined value, for example zero. The shape of the curve of the correction values determined after the measuring device has been put into operation once again is shown in the left-hand upper region of the diagram. The dashed curve reproduces the variation in the correction values $K(q)$ without the power cutting out. To prevent the possibly resulting erroneous measurements, a global status and a status value for each correction value $K(q)$ are stored.

In the case represented, the correction values in the right-hand region have the status 'certain' (solid curve), the correction values $K(q)$ in the left-hand upper region have the status 'uncertain' (dashed curve) and the correction values in the left-hand lower region have the status 'corrected with certainty' (dotted curve). Correction values not so far determined have the status 'undetermined' and the predetermined value, preferably zero. By further measurements, the individual regions that have a different status are merged with one another. For this purpose, it may be necessary to adapt the correction values $K(q)$ with different status values to one another.

LIST OF DESIGNATIONS 1 filling-level measuring device
2 container
3 container wall
4 filled product
5 surface of the filled product
6 container cover
7 opening
8 antenna
9 transmission circuit
10 reception/evaluation circuit
11 connecting line
12 transmission/reception filter
13 floating roof
14 stilling well
15 opening in the floating roof
q, $q_0$ filling level
K correction value
$\psi(q)$ distance value from the phase evaluation
$\psi'(q)$ corrected distance value from the phase evaluation
P phase correction value
$A(q)$ distance value from the amplitude evaluation
$A'(q)$ corrected distance value from the amplitude evaluation
S status value
$\lambda$ wavelength

What is claimed is:

1. A method for a highly accurate determination of a filling level of a product (4) in a container, comprising the steps of:
   transmitting measuring signals in a direction of a surface (5) of the product, the measuring signals being reflected at the surface as echo signals,
   determining the filling level in the container by evaluation of amplitude values and phase values of the reflected echo signals by means of a pulse delay-time method; and
   compensating, with a reception/evaluation circuit, for errors which occur in the determination of the filling level and are caused by interference signals which interfere constructively or destructively with the echo signals reflected regularly at the surface (5) of the product (4).

2. The method as claimed in claim 1, wherein a correction value ($K(q)$) is determined and stored for selected filling level values (q), at least within a critical filling-level measuring range ($F_{critical}$) in which the interference signals are produced.

3. The method as claimed in claim 2, wherein a unique correction value ($P(q)$) is determined on the basis of the determined correction value ($K(q)$), where $P=n\cdot\lambda/2$ with $n \in Z$, and wherein the phase distance value ($\psi(q)$) is corrected in a way corresponding to the unique correction value ($P(q)$).

4. The method as claimed in claim 3, wherein gray zones are defined, at which no unique phase correction value ($P(q)$) is defined after switching off and the correction value ($K(q)$) is small.

5. The method as claimed in claim 2, wherein the starting filling level ($q_0$) is measured, wherein the correction value (K) is initialized at zero, wherein, starting from this starting filling level ($q_0$), at least the critical filling-level measuring range ($FM_{critical}$) is run through and wherein a correction value ($K(q)$) is calculated and stored for every selected filling level value (q) within the filling-level measuring range ($FM_{critical}$).

6. The method as claimed in claim 1, wherein a starting filling level ($q_0$) is measured, wherein a correction value (K) is initialized at zero, wherein, starting from this starting filling level ($q_0$), at least a critical filling-level measuring range ($FM_{critical}$) is run through and wherein a correction value ($K(q)$) is calculated and stored for every selected filling level value (q) within the filling-level measuring range ($FM_{critical}$).

7. The method as claimed in claim 6, wherein, for providing a continuous set of correction values, the correction values ($K(q_K)$, $K(q_{K+1})$) between at least two filling level values ($q_K$, $q_{K+1}$) are interpolated.

8. The method as claimed in claim 7, wherein, for successive filling level values ($q_k=q_0$, $q_{k+1}$), are the correction values ($K(q_k)$, $K(q_{k+1})$) are determined as follows: for the starting filling level ($q_0$), the correction value $K(q_0)$ is initialized, so that for the starting filling level $q_0$ the corrected amplitude value ($A'(q_0)=A(q_0)+K(q_0)$) is equal to $A(q_0)$; for the filling level ($q_{k+1}$), the difference of the corrected amplitude value ($A'(q_{k+1})=A(q_{k+1})+K(q_k)$) and the phase value of the useful echo signal and the reference echo signal is calculated; as soon as a deviation between the differences of the amplitude values and the differences of the phase values occurs for a subsequently addressed filling level ($q_k$; $q_k \neq q_0$), the corresponding deviation for the filling level ($q_k$) is subtracted from the deviation determined for the filling level ($q_{k+1}$); for each successively addressed filling level ($q_k$; $q_k \neq q_0$), a new correction value $K(q_{k+1})=\psi(q_{k+1})-A'(q_{k+1})=\psi(q_{k+1})-A(q_{k+1})-K(q_k)$ is determined and stored.

9. The method as claimed in 7, wherein, in the case where all the correction values ($K(q)$) in the critical filling-level measuring range ($Q_{critical}$) are known, that correction value ($K(q)$) which has been stored for the respective filling level (q) is used after switching off the measuring device for correcting the determined filling level and, in the case where all the correction values ($K(q)$) in the critical filling-level measuring range ($FM_{critical}$) are not known, the correction value ($K(q)$) last stored before switching off is used for initialization after switching off the filling-level measuring device (1) if it is ensured that the filling level (q) has not changed in the meantime.

10. The method as claimed in claim 7, wherein, in the case where all the correction values (K(q)) in the critical filling-level measuring range ($FM_{critical}$) are not known, and if the possibility that the filling level (q) has changed in the meantime cannot be ruled out, a correction value (K' ($q_{outside}$)) is initialized at zero after switching off the filling-level measuring device (1); wherein a status value (S(q)), which provides information on the reliability of the respective correction value (K(q)), is stored for each correction value and wherein, in the course of further measurements, the correction values (K'($q_{outside}$)) determined are adapted to the correction values (K) already stored, the newly determined correction values (K') being corrected if need be.

11. The method as claimed in claim 6, wherein, for successive filling level values ($q_k=q_0$, $q_{k+1}$), the correction values (K($q_k$), K($q_{k+1}$)) are determined as follows: for a starting filling level ($q_0$), the correction value K($q_0$) is initialized, so that for the starting filling level $q_0$ the corrected amplitude value (A'($q_0$)=A($q_0$)+K($q_0$) ) is equal to A($q_0$); for a filling level ($q_{k+1}$), the difference of the corrected amplitude value (A'($q_{k+1}$)=A($q_{k+1}$)+K($q_k$)) and the phase value of the useful echo signal and the reference echo signal is calculated; as soon as a deviation between the differences of the amplitude values and the differences of the phase values occurs for a subsequently addressed filling level ($q_k$; $q_k \neq q_0$), the corresponding deviation for the filling level ($q_k$) is subtracted from the deviation determined for the filling level ($q_{k+1}$); for each successively addressed filling level ($q_k$; $q_k \neq q_0$), a new correction value K($q_{+1}$)=$\psi(q_{k+1})$−A'($q_{k+1}$)=$\psi(q_{k+1})$−A($q_{k+1}$)−K($q_k$) is determined and stored.

12. The method as claimed in claim 11, wherein the correction value (K($q_0$)) is initialized at a predetermined initialization value or at the value stored at $q_0$.

13. The method as claimed in claim 12, wherein, in the case where all the correction values (K(q)) in the critical filling-level measuring range ($Q_{critical}$) are known, that correction value (K(q)) which has been stored for the respective filling level (q) is used after switching off the measuring device for correcting the determined filling level and, in the case where all the correction values (K(q)) in the critical filling-level measuring range ($FM_{critical}$) are not known, the correction value (K(q)) last stored before switching off is used for initialization after switching off the filling-level measuring device (1) if it is ensured that the filling level (q) has not changed in the meantime.

14. The method as claimed in 11, wherein, in the case where all the correction values (K(q)) in the critical filling-level measuring range ($Q_{critical}$) are known, that correction value (K(q)) which has been stored for the respective filling level (q) is used after switching off the measuring device for correcting the determined filling level and, in the case where all the correction values (K(q)) in the critical filling-level measuring range ($FM_{critical}$) are not known, the correction value (K(q)) last stored before switching off is used for initialization after switching off the filling-level measuring device (1) if it is ensured that the filling level (q) has not changed in the meantime.

15. The method as claimed in claim 11, wherein, in the case where all the correction values (K(q)) in the critical filling-level measuring range ($FM_{critical}$) are not known, and if the possibility that the filling level (q) has changed in the meantime cannot be ruled out, a correction value (K' ($q_{outside}$)) is initialized at zero after switching off the filling-level measuring device (1); wherein a status value (S(q)), which provides information on the reliability of the respective correction value (K(q)), is stored for each correction value and wherein, in the course of further measurements, the correction values (K'($q_{outside}$)) determined are adapted to the correction values (K) already stored, the newly determined correction values (K') being corrected if need be.

16. The method as claimed in 6, wherein, in the case where all the correction values (K(q)) in a critical filling-level measuring range ($Q_{critical}$) are known, that correction value (K(q)) which has been stored for the respective filling level (q) is used after switching off the measuring device for correcting the determined filling level and, in the case where all the correction values (K(q)) in the critical filling-level measuring range ($FM_{critical}$) are not known, the correction value (K(q)) last stored before switching off is used for initialization after switching off the filling-level measuring device (1) if it is ensured that the filling level (q) has not changed in the meantime.

17. The method as claimed in claim 3, wherein, in the case where all the correction values (K(q)) in the critical filling-level measuring range ($FM_{critical}$) are not known, and if the possibility that the filling level (q) has changed in the meantime cannot be ruled out, a correction value (K' ($q_{outside}$)) is initialized at zero after switching off the filling-level measuring device (1); wherein a status value (S(q)), which provides information on the reliability of the respective correction value (K(q)), is stored for each correction value and wherein, in the course of further measurements, the correction values (K'($q_{outside}$)) determined are adapted to the correction values (K) already stored, the newly determined correction values (K') being corrected if need be.

18. An apparatus for determining a filling level of a product in a container, comprising: a transmission circuit (9) for generating measuring signals; at least one antenna (8), which transmits the measuring signals in the direction of a surface (5) of the filled product (4) and receives the reflected echo waves; and a reception/evaluation circuit (10), which determines the filling level of the filled product (4) in the container (2) on the basis of received echo signals by means of a pulse delay-time method; wherein the reception/evaluation circuit (10) compensates for errors which occur in the determination of the filling level and are caused by interference signals which interfere constructively or destructively with the echo signals reflected regularly at the surface (5) of the filled product (4).

19. The apparatus as claimed in claim 18, wherein a stilling well (14) is provided, by which the measuring signals are directed to the surface (5) of the filled product (4).

20. An apparatus determining a filling level of a product in a container, comprising: a transmission circuit (9) for generating measuring signals; at least one antenna (8), which transmits the measuring signals in the direction of a surface (5) of the filled product (4) and receives the reflected echo waves; and a reception/evaluation circuit (10), which determines the filling level of the filled product (4) in the container (2) on the basis of the received echo signals by means of a pulse delay-time method; wherein the reception/evaluation circuit (10) compensates for errors which occur in the determination of the filling level and are caused by interference signals which interfere constructively or destructively with the echo signals reflected regularly at the surface (5) of the filled product (4) by determining and storing a correction value (K(q)) for selected filling level values (q), at least within a critical filling-level measuring range ($F_{critical}$) in which the interference signals are produced.

21. An apparatus for determining a filling level of a product in a container, comprising: a transmission circuit (9)

for generating measuring signals; at least one antenna (8), which transmits the measuring signals in the direction of a surface (5) of the filled product (4) and receives the reflected echo waves; and a reception/evaluation circuit (10), which determines the filling level of the filled product (4) in the container (2) on the basis of the received echo signals by means of a pulse delay-time method; wherein the reception/evaluation circuit (10) compensates for errors which occur in the determination of the filling level and are caused by interference signals which interfere constructively or destructively with the echo signals reflected regularly at the surface (5) of the filled product (4) by measuring a starting filling level ($q_0$), by initializing a correction value (K) at zero, by running through at least a critical filling-level measuring range ($FM_{critical}$) starting from the starting filling level($q_0$), and by calculating and storing a correction value (K(q)) for every selected filling level value (q) within the filling-level measuring range ($FM_{critical}$).

22. An apparatus for determining a filling level of a product in a container, comprising: a transmission circuit (9) for generating measuring signals; at least one antenna (8), which transmits the measuring signals in the direction of a surface (5) of the filled product (4) and receives the reflected echo waves; and a reception/evaluation circuit (10), which determines the filling level of the filled product (4) in the container (2) on the basis of the received echo signals by means of a pulse delay-time method; wherein the reception/evaluation circuit (10) compensates for errors which occur in the determination of the filling level and are caused by interference signals which interfere constructively or destructively with the echo signals reflected regularly at the surface (5) of the filled product (4) by measuring a starting filling level ($q_0$), by initializing a correction value (K) at zero, by running through at least a critical filling-level measuring range ($FM_{critical}$) starting from the starting filling level ($q_0$), by calculating and storing a correction value (K(q)) for every selected filling level value (q) within the filling-level measuring range ($FM_{critical}$), and by interpolating the correction values ($K(q_K)$, $K(q_{K+1})$) between at least two filling level values ($q_K$, $q_{K+1}$) for providing a continuous set of correction values.

23. An apparatus for determining a filling level of a product in a container, comprising: a transmission circuit (9) for generating measuring signals; at least one antenna (8), which transmits the measuring signals in the direction of a surface (5) of the filled product (4) and receives the reflected echo waves; and a reception/evaluation circuit (10), which determines the filling level of the filled product (4) in the container (2) on the basis of the received echo signals by means of a pulse delay-time method; wherein the reception/evaluation circuit (10) compensates for errors which occur in the determination of the filling level and are caused by interference signals which interfere constructively or destructively with the echo signals reflected regularly at the surface (5) of the filled product (4) by measuring a starting filling level ($q_0$), by initializing a correction value (K) at zero, by running through at least a critical filling-level measuring range ($FM_{critical}$) starting from the starting filling level($q_0$), by calculating and storing a correction value (K(q)) for every selected filling level value (q) within the filling-level measuring range ($FM_{critical}$ ), by determining the correction values ($K(q_k)$, $K(q_{k+1})$) for successive filling level values ($q_k=q_0$, $q_{k+1}$) as follows: by initializing the correction value $K(q_0)$ for a starting filling level ($q_0$) so that for the starting filling level $q_0$ a corrected amplitude value ($A'(q_0)=A(q_0)+K(q_0)$) is equal to $A(q_0)$, by calculating a difference of the corrected amplitude value ($A'(q_{k+1})=A(q_{k+1})+K(q_k)$) and a phase value of a useful echo signal and a reference echo signal for a filling level ($q_{k+1}$), by subtracting a corresponding deviation for the filling level ($q_k$) from a deviation determined for the filling level ($q_{k+1}$) as soon as a deviation between the differences of the amplitude values and the differences of the phase values occurs for a subsequently addressed filling level ($q_k$; $q_k \neq q_0$), and by determining and storing a new correction value $K(q_{k+1})=\psi(q_{k+1})-A'(q_{k+1})=\psi(q_{k+1})-A(q_{k+1})-K(q_k)$ for each successively addressed filling level ($q_k$; $q_k \neq q_0$).

24. An apparatus for determining a filling level of a product in a container, comprising: a transmission circuit (9) for generating measuring signals; at least one antenna (8), which transmits the measuring signals in the direction of a surface (5) of the filled product (4) and receives the reflected echo waves; and a reception/evaluation circuit (10), which determines the filling level of the filled product (4) in the container (2) on the basis of the received echo signals by means of a pulse delay-time method; wherein the reception/evaluation circuit (10) compensates for errors which occur in the determination of the filling level and are caused by interference signals which interfere constructively or destructively with echo signals reflected regularly at the surface (5) of the filled product (4) by initializing a correction value $K(q_0)$) at one of a predetermined initialization value and a value stored at a starting filling level ($q_0$).

25. An apparatus for determining a filling level of a product in a container, comprising: a transmission circuit (9) for generating measuring signals; at least one antenna (8), which transmits the measuring signals in the direction of a surface (5) of the filled product (4) and receives the reflected echo waves; and a reception/evaluation circuit (10), which determines the filling level of the filled product (4) in the container (2) on the basis of the received echo signals by means of a pulse delay-time method; wherein the reception/evaluation circuit (10) compensates for errors which occur in the determination of the filling level and are caused by interference signals which interfere constructively or destructively with echo signals reflected regularly at the surface (5) of the filled product (4) by measuring a starting filling level ($q_0$), by initializing a correction value (K) at zero, by running through at least a critical filling-level measuring range ($FM_{critical}$) starting from the starting filling level($q_0$), by calculating and storing a correction value (K(q)) for every selected filling level value (q) within the filling-level measuring range ($FM_{critical}$), by using the correction value (K(q)) which has been stored for the respective filling level (q) for correcting the determined filling level after switching off the transmission circuit (9) when all the correction values (Kq)) in a critical filling-level measuring range ($Q_{critical}$) are known, and by using the correction value (K(q)) last stored before the switching off for initialization after the switching off when all the correction values (K(q)) in the critical filling-level measuring range ($FM_{critical}$) are not known but it is ensured that the filling level (q) has not changed in the meantime.

26. An apparatus for determining a filling level of a product in a container, comprising: a transmission circuit (9) for generating measuring signals; at least one antenna (8), which transmits the measuring signals in the direction of a surface (5) of the filled product (4) and receives reflected echo waves; and a reception/evaluation circuit (10), which determines the filling level of the filled product (4) in the container (2) on the basis of the received echo signals by means of a pulse delay-time method; wherein the reception/evaluation circuit (10) compensates for errors which occur in the determination of the filling level and are caused by interference signals which interfere constructively or destructively with echo signals reflected regularly at the surface (5) of the filled product (4) by initializing correction value ($K'(q_{outside})$) at zero after switching off the transmission circuit (9) when all correction values ($K(q)$) in a critical filling-level measuring range ($FM_{critical}$) are not known and the possibility that the filling level has changed in the meantime is not ruled out, by storing a status value ($S(q)$), which provides information on the reliability of the respective correction value ($K(q)$), for each correction value, by, in the course of further measurements, adapting the determined correction values ($K'(q_{outside})$) to correction values ($K$) already stored, and by correcting newly determined correction values ($K'$) when necessary.

27. An apparatus for determining a filling level of a product in a container, comprising: a transmission circuit (9) for generating measuring signals; at least one antenna (8), which transmits the measuring signals in the direction of a surface (5) of the filled product (4) and receives the reflected echo waves; and a reception/evaluation circuit (10), which determines the filling level of the filled product (4) in the container (2) on the basis of the received echo signals by means of a pulse delay-time method; wherein the reception/evaluation circuit (10) compensates for errors which occur in the determination of the filling level and are caused by interference signals which interfere constructively or destructively with echo signals reflected regularly at the surface (5) of the filled product (4) by determining a unique correction value ($P(q)$) on the basis of a determined correction value ($K(q)$), where $P=n\cdot\lambda/2$ with $n \in Z$, and by correcting a phase distance value ($\psi(q)$) in a way corresponding to the unique correction value ($P(q)$).

28. An apparatus for determining a filling level of a product in a container, comprising: a transmission circuit (9) for generating measuring signals; at least one antenna (8), which transmits the measuring signals in the direction of a surface (5) of the filled product (4) and receives the reflected echo waves; and a reception/evaluation circuit (10), which determines the filling level of the filled product (4) in the container (2) on the basis of the received echo signals by means of a pulse delay-time method; wherein the reception/evaluation circuit (10) compensates for errors which occur in the determination of the filling level and are caused by interference signals which interfere constructively or destructively with echo signals reflected regularly at the surface (5) of the filled product (4) by defining gray zones, at which no unique phase correction value ($P(q)$) is defined, after switching off the transmission circuit (9) and when a correction value ($K(q)$) is small.

* * * * *